United States Patent
Wheelock

(10) Patent No.: US 11,728,831 B2
(45) Date of Patent: Aug. 15, 2023

(54) MULTIBAND SWITCHING WI-FI RADIO

(71) Applicant: ARRIS Enterprises LLC, Suwanee, GA (US)

(72) Inventor: Ian Wheelock, Cork (IE)

(73) Assignee: ARRIS ENTERPRISES LLC, Suwanee, GA (US)

(*) Notice: Subject to any disclaimer, the term of this patent is extended or adjusted under 35 U.S.C. 154(b) by 56 days.

(21) Appl. No.: 17/337,785

(22) Filed: Jun. 3, 2021

(65) Prior Publication Data
US 2021/0391876 A1    Dec. 16, 2021

Related U.S. Application Data

(60) Provisional application No. 63/038,259, filed on Jun. 12, 2020.

(51) Int. Cl.
| H04B 1/00 | (2006.01) |
| H04B 7/155 | (2006.01) |
| H04W 72/12 | (2023.01) |
| H04W 84/12 | (2009.01) |

(52) U.S. Cl.
CPC .......... *H04B 1/005* (2013.01); *H04B 7/15507* (2013.01); *H04W 72/12* (2013.01); *H04W 84/12* (2013.01)

(58) Field of Classification Search
CPC ...... H04B 1/005; H04B 7/15507; H04B 1/02; H04W 72/12; H04W 84/12; H04W 48/08; H04W 88/10
USPC ........................................................ 370/315
See application file for complete search history.

(56) References Cited

U.S. PATENT DOCUMENTS

| 2004/0196812 A1 | 10/2004 | Barber | |
| 2005/0124294 A1* | 6/2005 | Wentink | H04W 72/1263 455/41.2 |
| 2015/0256323 A1* | 9/2015 | Gandarillas Diego | H04L 5/16 370/281 |

(Continued)

OTHER PUBLICATIONS

International Search Report dated Sep. 22, 2021 in International (PCT) Application No. PCT/US2021/035647.

(Continued)

*Primary Examiner* — Ricardo H Castaneyra
*Assistant Examiner* — Syed M Bokhari
(74) *Attorney, Agent, or Firm* — Wenderoth, Lind & Ponack, LLP

(57) ABSTRACT

An electronic wireless communication apparatus including a radio configured to selectively switch between a first band and a second band so as to selectively communicate with stations on the first band and stations on the second band, and a processor configured to cause the apparatus to perform at least: switching the radio to the first band during a first duration, and disabling communication by the radio on the second band during the first duration; transmitting a first stop signal instructing the stations associated with the first band to not communicate during the second duration; switch the radio to the second band during the second duration, and disable communication by the radio on the first band during the second duration; and transmitting a second stop signal instructing the stations associated with second band to not communicate during the first duration.

12 Claims, 10 Drawing Sheets

(56) References Cited

U.S. PATENT DOCUMENTS

2016/0029384 A1* 1/2016 Sidhu ................ H04W 72/0453
 370/329
2016/0249378 A1* 8/2016 Zhou ................. H04W 72/1268

OTHER PUBLICATIONS

Song, Taewon et al., "Multi-link Management", IEEE Draft, IEEE-SA Mentor, Piscataway, NJ, USA, Nov. 2019, vol. 802.11 EHT, No. 1, pp. 1-12, XP068165047.

* cited by examiner

MULTIBAND SWITCHING WI-FI RADIO

BACKGROUND

The present disclosure is related to Wi-Fi devices having at least one radio subsystem that sequentially switches frequency bands.

SUMMARY

Aspects of the present disclosure are drawn to an electronic wireless communication apparatus for use with at least one station (STA). The electronic wireless communication apparatus includes a radio configured to selectively switch between a first band and a second band so as to selectively communicate with at least one STA associated for communication on the first band and at least one STA associated for communication on the second band, a memory having instructions stored thereon, and a processor configured to execute the instructions stored on the memory to cause the apparatus to perform at least the following: (a) switch the radio to the first band to enable communication with the at least one STA associated for communication on the first band during a first duration, and disable communication by the radio on the second band during the first duration; (b) transmit, at a time during the first duration, a first stop signal including a second duration value to the at least one STA associated for communication on the first band, the first stop signal instructing the at least one STA associated for communication on the first band to not communicate on the first band during the second duration indicated in the signal; (c) switch the radio to the second band to enable communication with the at least one STA associated for communication on the second band during the second duration, and disable communication by the radio on the first band during the second duration; and (d) transmit, at a time during the second duration, a second stop signal including a first duration value to the at least one STA associated for communication on the second band, the signal instructing the at least one STA associated for communication on the second band to not communicate on the second band during the first duration indicated in the signal.

In some embodiments, the electronic wireless communication apparatus the processor repeats a through d.

In some embodiments, one of the at least one STA associated for communication on the second band is a backhaul STA of a wireless extender device.

In some embodiments, the first band has a first BSSID thereon, and the second band has a second BSSID thereon, and the second BSSID is different from the first BSSID.

Other aspects of the present disclosure are drawn to an electronic wireless communication method for use with a processor and a radio configured to selectively switch between a first band and a second band so as to selectively communicate with at least one STA associated for communication on the first band and at least one STA associated for communication on the second band, said method comprising: (a) switching, by the processor, the radio to the first band to enable communication with the at least one STA associated for communication on the first band during a first duration, and disable communication by the radio on the second band during the first duration; (b) transmitting, via the radio, at a time during the first duration, a first stop signal including a second duration value to the at least one STA associated for communication on the first band, the first stop signal instructing the at least one STA associated for communication on the first band to not communicate on the first band during the second duration indicated in the signal; (c) switching, by the processor, the radio to the second band to enable communication with the at least one STA associated for communication on the second band during the second duration, and disable communication by the radio on the first band during the second duration; and (d) transmitting, via the radio, at a time during the second duration, a second stop signal including a first duration value to the at least one STA associated for communication on the second band, the signal instructing the at least one STA associated for communication on the second band to not communicate on the second band during the first duration indicated in the signal.

In some embodiments, the method includes repeating a through d.

Other aspects of the present disclosure are directed to a non-transitory computer-readable medium for use with a processor and a radio configured to selectively switch between a first band and a second band so as to selectively communicate with at least one STA associated for communication on the first band and at least one STA associated for communication on the second band, the non-transitory computer-readable medium having stored thereon instructions for execution by the processor perform at least the following: (a) switching, by the processor, the radio to the first band to enable communication with the at least one STA associated for communication on the first band during a first duration, and disable communication by the radio on the second band during the first duration; (b) transmitting, via the radio, at a time during the first duration, a first stop signal including a second duration value to the at least one STA associated for communication on the first band, the first stop signal instructing the at least one STA associated for communication on the first band to not communicate on the first band during the second duration indicated in the signal; (c) switching, by the processor, the radio to the second band to enable communication with the at least one STA associated for communication on the second band during the second duration, and disable communication by the radio on the first band during the second duration; and (d) transmitting, via the radio, at a time during the second duration, a second stop signal including a first duration value to the at least one STA associated for communication on the second band, the signal instructing the at least one STA associated for communication on the second band to not communicate on the second band during the first duration indicated in the signal.

In some embodiments, the non-transitory computer-readable medium includes instructions for execution by the processor further perform at least the following: repeating a through d.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
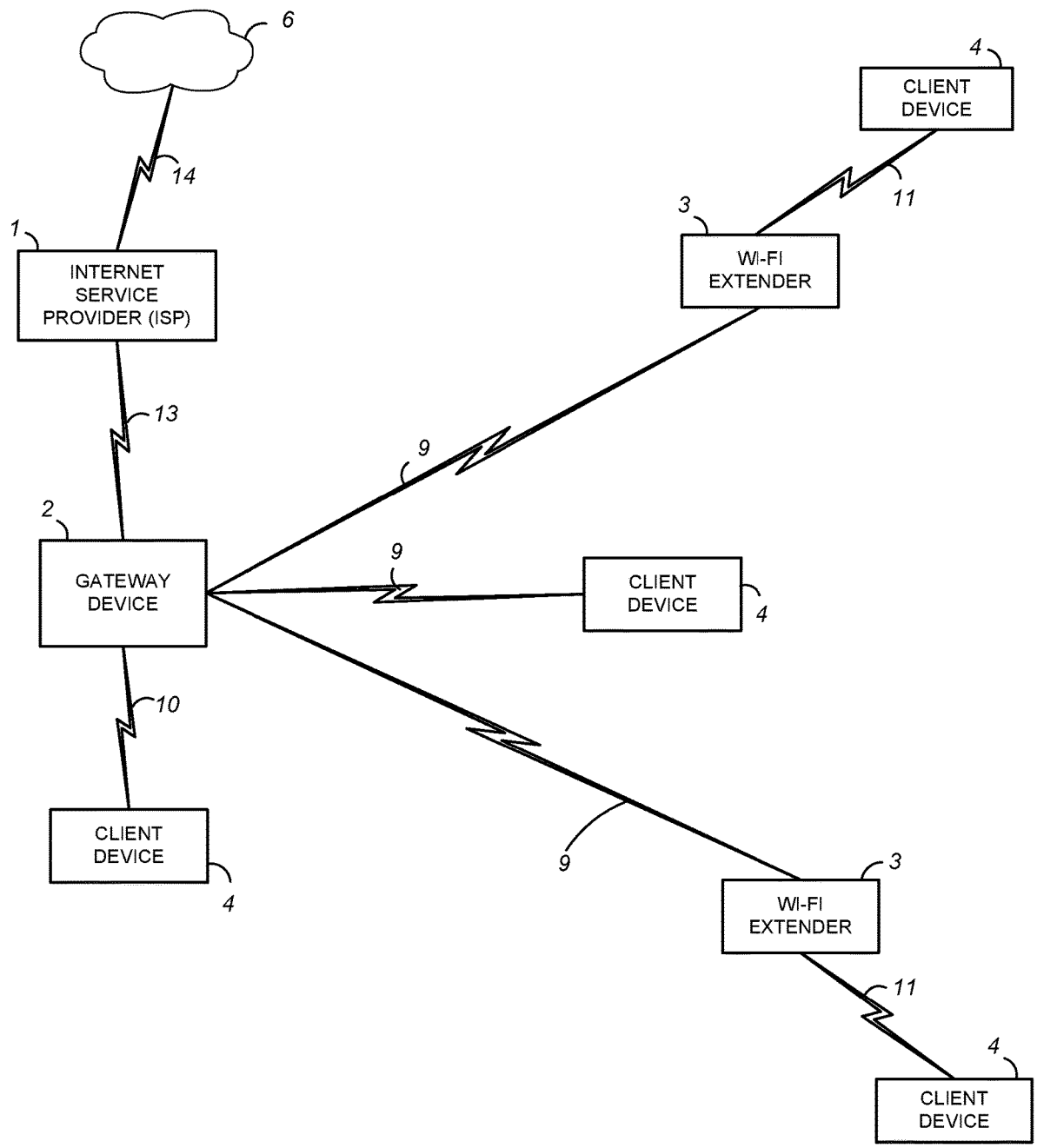
FIG. 1 is a schematic diagram of a system according to an embodiment of the present disclosure.

FIG. 1 is a schematic diagram of a system according to an embodiment of the present disclosure. As shown in FIG. 1, the main elements of the system include a gateway device 2 connected to the Internet 6 via an Internet Service Provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul network, or Internet of things (IoT) network) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

Starting from the top of FIG. 1, the ISP 1 can be, for example, a streaming video provider or any computer for connecting the gateway device 2 to the Internet 6. The connection 14 between the Internet 6 and the ISP 1 and the connection 13 between the ISP 1 and the gateway device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, a 2G, 3G, 4G or 5G network, WiMax, or a IEEE 802.11 wireless network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE) or 5G protocols.

It is also contemplated by the present disclosure that connection 13 is capable of providing connections between the gateway device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The gateway device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It is also contemplated by the present disclosure that the gateway device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The connection 9 between the gateway device 2, the wireless extenders 3, and client devices 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection.

The wireless extenders 3 can be, for example, hardware electronic devices such as access points used to extend the wireless network by receiving the signals transmitted by the gateway device 2 and rebroadcasting the signals to, for example, client devices 4, which may out of range of the gateway device 2. The wireless extenders 3 can also receive signals from the client devices 4 and rebroadcast the signals to the gateway device 2, or other client devices 4.

The connection 11 between the wireless extenders 3 and the client devices 4 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the gateway device 2. Additionally, the client devices 4 can be a TV, an IP/QAM STB or an SMD that is capable of decoding audio/video content, and playing over OTT or MSO provided content received through the gateway device 2.

The connection 10 between the gateway device 2 and the client device 4 is implemented through a wireless connection that operates in accordance with, but is not limited to, any IEEE 802.11 protocols. Additionally, the connection 10 between the gateway device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 10 can also be a wired Ethernet connection. Connections 9 and 10 can be of differing protocols from one another.

Figure 2:
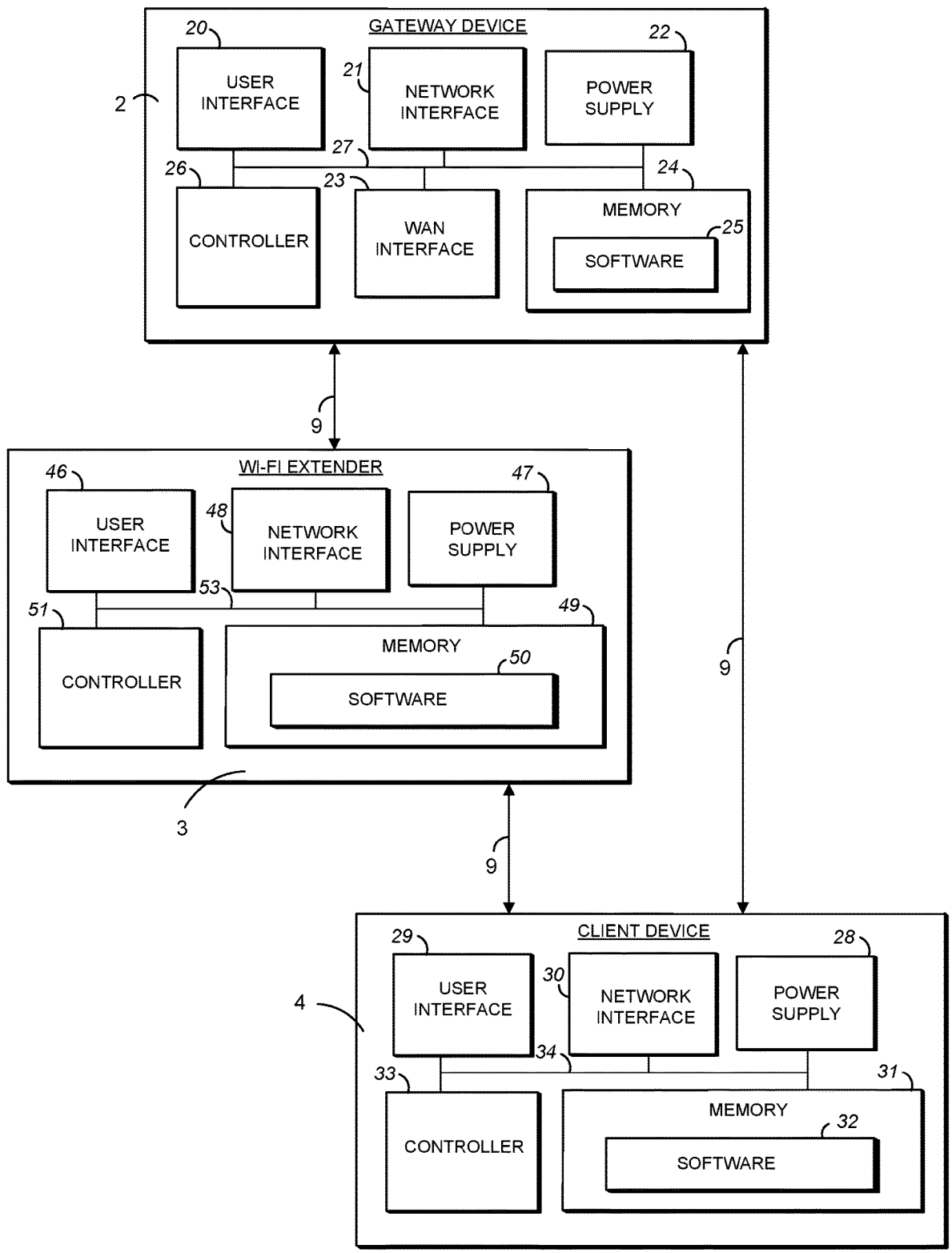
FIG. 2 is a more detailed schematic diagram of an exemplary gateway device, an exemplary wireless extender device, and an exemplary client device implemented in the system of FIG. 1.

A detailed description of the exemplary internal components of the gateway device 2, the wireless extenders 3, and the client devices 4 shown in FIG. 1 will be provided in the discussion of FIG. 2. However, in general, it is contemplated by the present disclosure that the gateway device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the gateway device 2, the wireless extenders 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The gateway device 2, the wireless extenders 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary gateway device 2, an exemplary wireless extender 3, and an exemplary client device 4 implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, cellular networks, and interconnecting with other devices via Wi-Fi and Bluetooth, or other wireless hand-held consumer electronic device capable of executing and displaying the content received through the gateway device 2. Additionally, the client device 4 can be a TV, an IP/QAM STB, or an SMD that is capable of decoding audio/video content, and playing over OTT or MSO provided content received through the gateway device 2.

As shown in FIG. 2, the client device 4 includes a power supply 28, user interface 29, network interface 30, a memory 31, and a controller 33. The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display device including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the wireless protocols in accordance with connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms for controlling the general function and operations of the client device 4 in accordance with the embodiments described in the present disclosure (e.g., including the optimized onboarding according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 4 in accordance with the embodiments described in the present disclosure. Communication between the components (e.g., 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 can also receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a CRT, a TFT, an LED, an HD or other similar display device including a display device having touch screen capabilities so as to allow interaction between a user and the wireless extender 3. The power supply 47 supplies power to the internal components of the wireless extender 3 through the internal bus 53. The power supply 47 can include a self-contained power source such as a battery pack with an interface to be powered through an electrical charger connected to an outlet (e.g., either directly or by way of another device). The power supply 47 can also include a rechargeable battery that can be detached allowing for replacement such as a NiCd, a NiMH, a Li-ion, or a Li-pol battery.

The network interface 48 can include various network cards, interfaces, and circuitry implemented in software and/or hardware to enable communications with the client device 4 and the gateway device 2 using the wireless protocols in accordance with connection 9 (e.g., as described with reference to FIG. 1). The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 associated for controlling the general functions and operations of the wireless extender 3 in accordance with the embodiments described in the present disclosure (e.g., including optimized onboarding according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3 in accordance with the embodiments described in the present disclosure. General communication between the components (e.g., 46-49 and 51) of the wireless extender 3 may be established using the internal bus 53.

As shown in FIG. 2, the gateway device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance connection 10 (e.g., as described with reference to FIG. 1).

The power supply 22 supplies power to the internal components of the gateway device 2 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery. The WAN interface 23 may include various network cards, and circuitry implemented in software and/or hardware to enable communications between the gateway device 2 and the ISP 1 using the wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (wireless extenders 3 and client device 4) in the network in accordance with the embodiments described in the present disclosure (e.g., including optimized onboarding of device according to the embodiments of the present disclosure).

The controller 26 controls the general operations of the gateway device 2 as well as performs management functions related to the other devices (wireless extenders 3 and client device 4) in the network. The controller 26 can include, but is not limited to, one or more hardware electronic circuits, such as a processor, a microprocessor, a multi-core processor, a single core processor, a FPGA, a microcontroller, an ASIC, a DSP, or other similar processing device capable of executing any type of instructions, algorithms, or software for controlling the operation and functions of the gateway device 2 in accordance with the embodiments described in the present disclosure. Communication between the components (e.g., 20-22, 24, and 26) of the gateway device 2 may be established using the internal bus 27.

As discussed above the gateway device 2, and optional extender devices 3, are access point devices (APs). The APs are either dual band concurrent (DBC) or tri band concurrent (TBC), meaning that they transmit on either two or three radio frequency bands at the same time. DBC APs generally support 2.4 GHz and 5 GHz concurrent operation, while TBC APs support 2.4 GHz and split the 5 GHz band into a lower (5150-5350 MHz) band and an upper (5470-5850 MHz) band, operating anywhere from 2 to 4 radios per band. Therefore, each AP potentially includes 12 active radios in total in its respective network interface circuitry.

Unlicensed 5 GHz spectrum is used for Wi-Fi, and a large portion of Wi-Fi stations (STAs) support this band. The 5 GHz spectrum is a significant amount of spectrum, from 5.15 GHz to 5.85 GHz, with a break (where it cannot operate) between 5.35 GHz and 5.47 GHz. The lower portion, below the break, is sometimes referred to herein as 5 GHz Low, and the higher portion, above the break, is sometimes referred to herein a 5 GHz High. Because of this break in spectrum, an AP could operate two separate radio subsystems in the 5 GHz band, i.e., one in the 5 GHz Low band, and one in the 5 GHz High bank, as long as sufficient filtering and isolation is provided to ensure concurrent operation by the subsystems.

If the AP is a TBC AP, it operates to the limit in both the 5 GHz Low and 5 GHz High spectrum ranges, and offers a doubling of bandwidth capacity from the AP. A 4×4 5 GHz radio subsystem, which includes 4 transmit antennas and 4 receive antennas, operating with an 80 MHz channel bandwidth is capable of 1733 Mbps, while this is doubled to 3466 Mbps if a 160 MHz channel bandwidth is available. With two 5 GHz subsystems operating concurrently using 160 MHz channel bandwidth, then nearly 7 Gbps of bandwidth is available.

Figure 3:
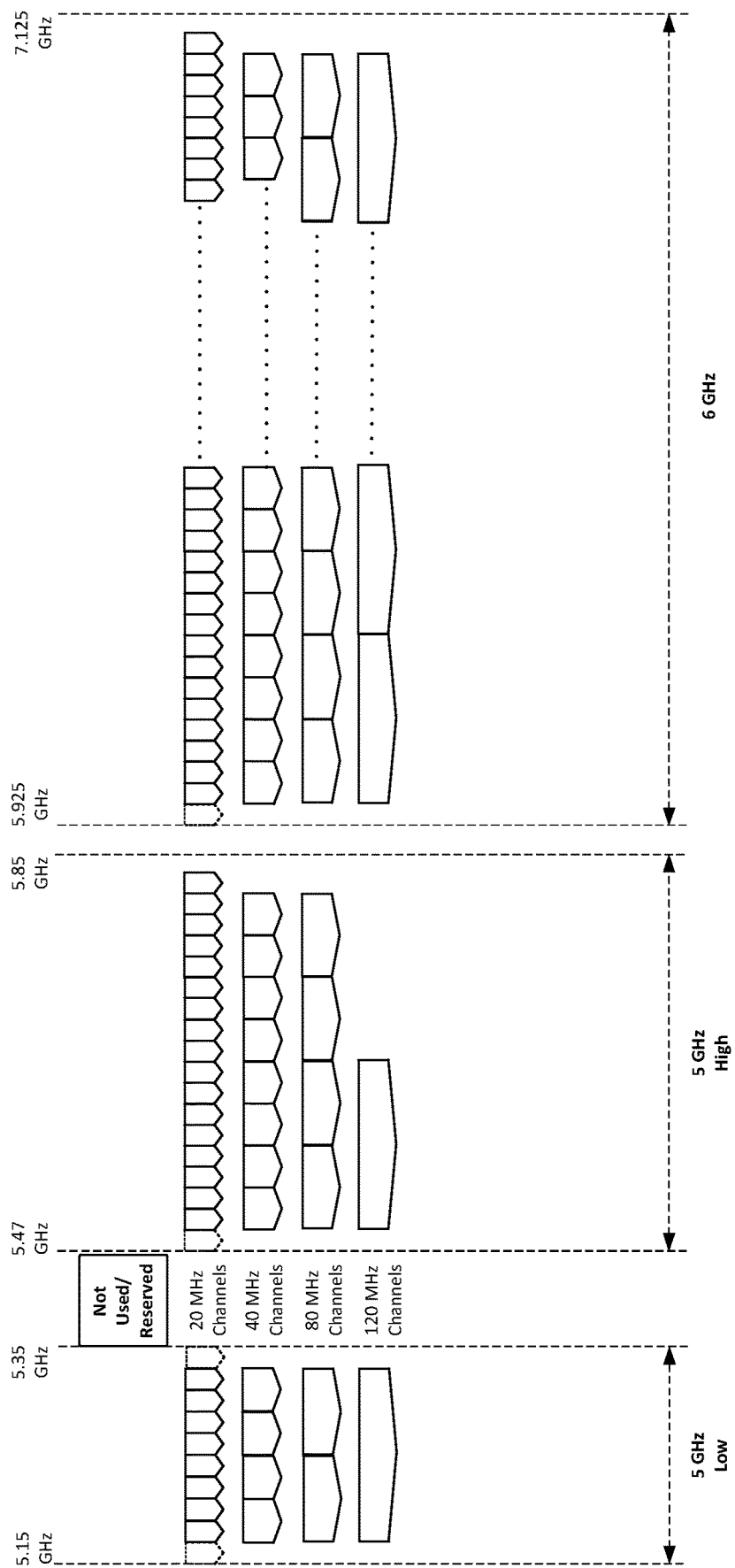
FIG. 3 is a graphical representation of the 5 GHz and 6 GHz spectrums.

As shown in FIG. 3, the FCC unlicensed 6 GHz spectrum encompasses a frequency range from 5.925-7.125 GHz (1.2 GHz wide) for Wi-Fi use. A number of power and frequency limitations exist within this space, but in general, the spectrum offers a significant addition to the Wi-Fi spectrum. The AP devices disclosed herein are configured to take advantage of this spectrum.

Like any consumer electronic device, APs are price sensitive, and need to meet a price point that enables consumer adoption, while also covering the hardware costs and margin needs of manufacturers. In order to create a new 6 GHz based AP, based on how DBC/TBC APs were developed before, there is a potentially large additional cost to operate 6 GHz, certainly in the mode of a TBC, as well as questions about how to arrange the AP radio subsystems to take advantage of the available spectrum. For instance, a TBC AP configured to utilize the 6 GHz spectrum can operate as a (2.4)/(5L)/(5H+6) TBC AP device. The 5 GHz High subband includes more spectrum and higher available power operation than the 5 GHz Low sub-band, but is subject to DFS/Radar detection. A (2.4)/(5L)/(5H+6) TBC AP device utilizes a mix of 5H+6 in one of the tri-bands, which means that the available 5 GHz High spectrum is potentially not available if the TBC AP operates in the 6 GHz band, which is a loss of available usable spectrum. A DBC AP configured to utilize the 6 GHz band can operation as a (2.4)/(5+6) DBC AP operation. Again, when the (2.4)/(5+6) DBC AP operates in 6 GHz, then none of the 5 GHz spectrum can be used, which is a big loss given the bandwidth capacity and number of 5 GHz clients that exist.

The above-described DBC AP with 6 GHz support ends up losing support for 5 GHz if 6 GHz is operational, and the above-described TBC AP with 2.4/5/6 GHz support is expensive and needs additional filtering to enable concurrent operation of 5 and 6 GHz bands.

Figure 4:
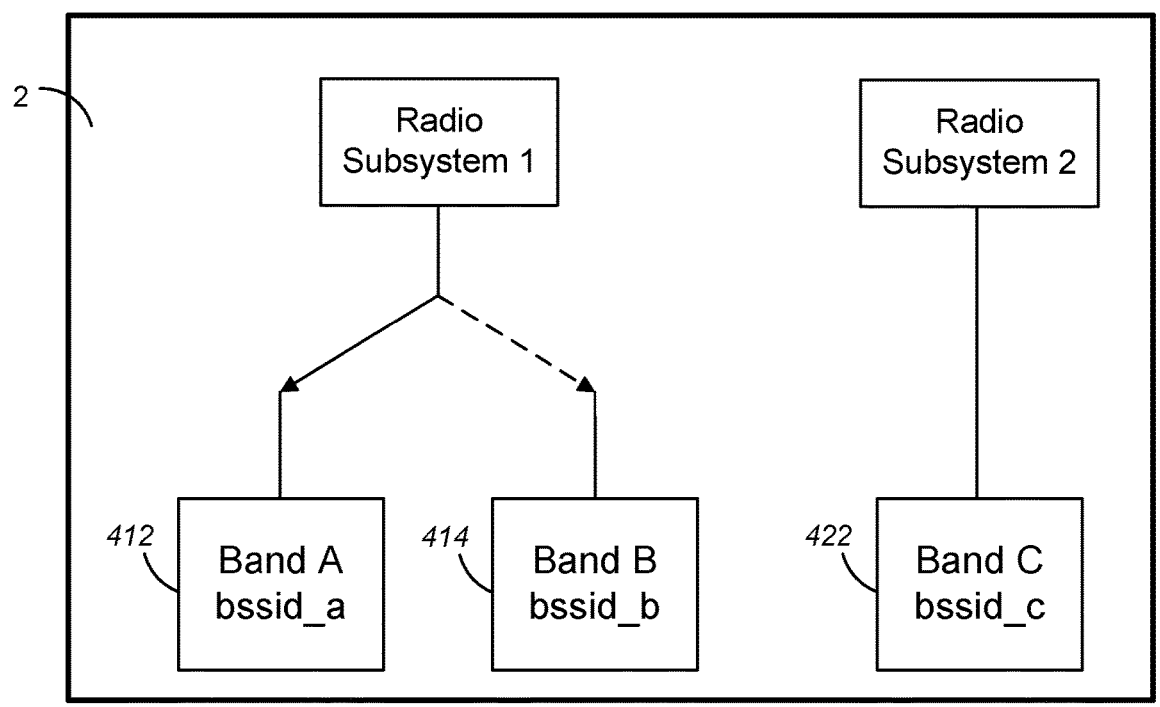
FIG. 4 is a diagram of an embodiment of an AP device with a band switching radio subsystem.

FIG. 4 illustrates an exemplary configuration of dual radio subsystems in an AP device (such as gateway device 2 or an extender device 3). The dual radio subsystems are controlled by a processor to implement pseudo concurrent operation of multiple bands (including 5 and 6 GHz bands, or 5 L and 5 H) from an AP based on the use of a time-sharing system that rapidly switches between the two bands, ensuring that clients connected on both bands are offered sufficient access when the AP is operating on each band, while also preventing clients from communicating to the AP when it is not actively listening on that band.

The benefit of this system is that the traditional filtering and isolation associated with concurrent radio operation between two bands (such as 5 and 6 GHz) is not required as the radio subsystem is active on either one or the other band, but not both at the exact same time.

The AP shown in FIG. 4 (e.g., gateway 2, but could be an extender 3) could serve as a TBC AP, with three band, i.e., band A 412, band B 414, and band C 422. Radio subsystem 1 switches between band A and band B, whereas radio subsystem 2 is dedicated to band C. For example, the bands could be configured as follows: band A—5 GHz band, band B—6 GHz band, and band C—2.4 GHz band. Another example is that the bands could be configured as follows: band—5 GHz low band, band B—5 GH high band, and band C—2.4 GHz band. Yet another example is that the bands could be configured as follows: band A—2.4 GHz band, band B—5 GHz high band, and band C—6 GHz band. Various considerations can inform the decision as to which band should be served by the dedicated radio subsystem 2 and which channels are served by the time-splitting radio subsystem 1, such as anticipated number of client devices, anticipated backhaul traffic, etc.

Figure 5:
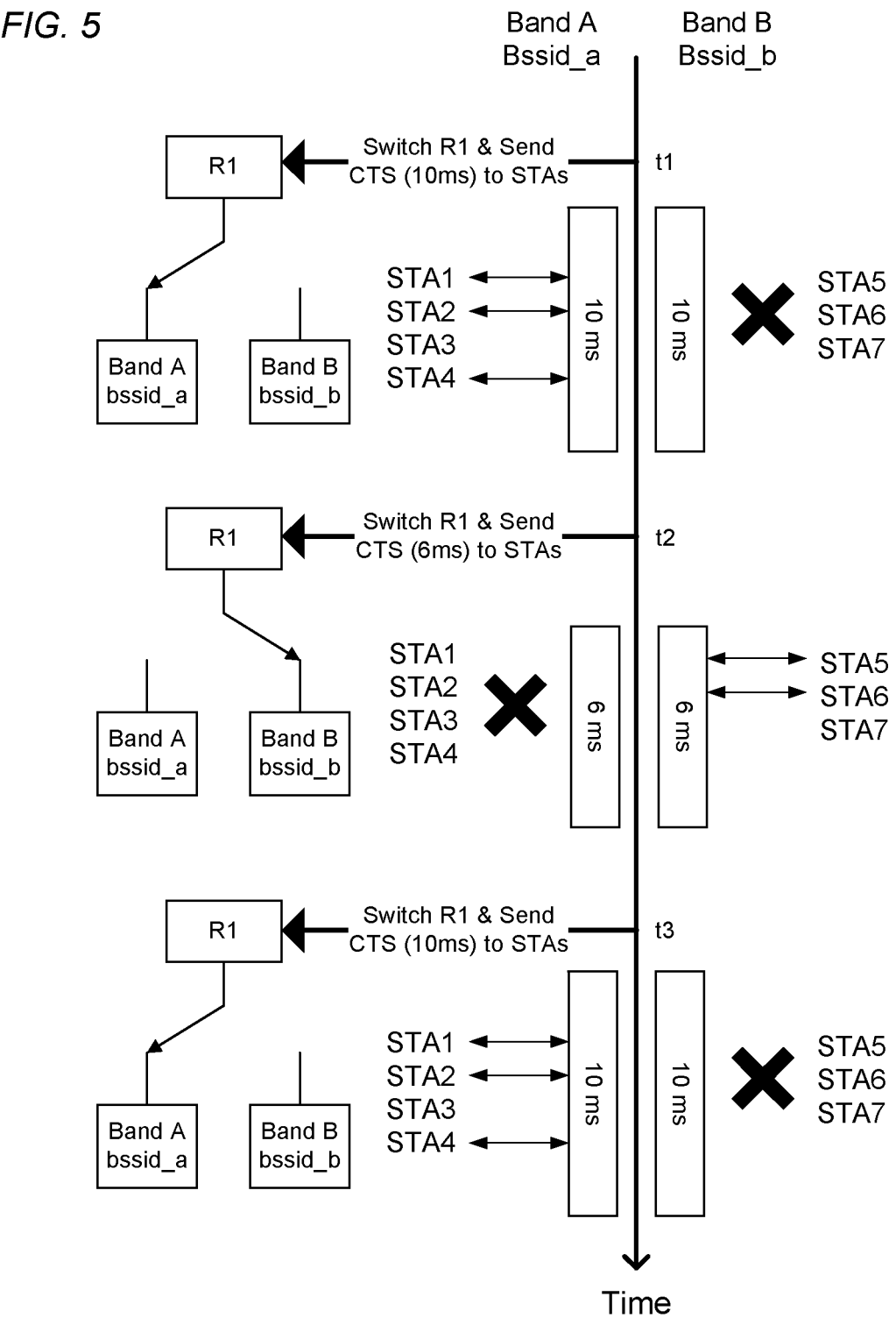
FIG. 5 is a sequence diagram of an example switching operation of the band switching radio subsystem.

FIG. 5 shows a sequence diagram, not to scale, of an exemplary switching operation of the radio subsystem 1. Along the left side of FIG. 5 are shown three sequential states of the radio subsystem 1 (R1), first switched to band A, then switched to band B, and (on the bottom left) switched again to band A. The switch signals for these three sequential states are sent at times t1, t2, and t3, respectively. Between the times t1, t2, and t3 are time periods of 10 ms or 6 ms, during which the AP communicates with STAs on band A (shown to the left of the vertical time line) or with STAs on band B (shown to the right of the vertical time line).

With two bands, A and B, the AP switches the radio subsystem 1 (R1) to band A at time t1 and operates a BSSID on band A (bssid_a) for a period of time, (Tnc_a), e.g., 10 ms, and sends a signal to all STAs associated with bssid_b to not communicate on the band for this period of time (Tnc_a), e.g., 10 ms. During this time Tnc_a, the AP communicates with the STAs that are associated with bssid_a (STA1, STA2, STA3, STA4) and does not communicate with the STAs that are associated with bssid_b (STA5, STA6, STA7). Also during this time, in response to the signal sent by the AP, the STAs associated with bssid_b (STA5, STA6, STA7) do not to communicate on the band for this period of time (Tnc_a), e.g., 10 ms. At time t2, the AP sends a signal to the STAs associated with bssid_a (STA1, STA2, STA3, STA4) to not communicate on band A for a period of time Tnc_b, e.g., 6 ms, and switches to band B. Data indicating the duration is included in the signal so the STAs know how long to not communicate on band A.

The AP then operates a BSSID on band B (bssid_b) for a period of time, (Tnc_b), e.g., 6 ms. During this time Tnc_b, the AP communicates with the STAs that are associated with bssid_b (STA5, STA6, STA7) and does not communicate with the STAs that are associated with bssid_a (STA1, STA2, STA3, STA4). Also during this time, in response to the signal sent by the AP, the STAs associated with bssid_a (STA1, STA2, STA3, STA4) do not to communicate on the band for this period of time (Tnc_a), e.g., 6 ms. At time t3, the AP sends a signal to the STAs associated with bssid_b (STA5, STA6, STA7) to not communicate on band B for a period of time (Tnc_a), e.g., 10 ms, and switches to band A. Data indicating the duration is included in the signal so the STAs know how long to not communicate on band B.

The process of switching between bands continues like this, providing bursts of time to each bssid on a different band. The time spent on each band can be changed dynamically by the AP, according to software (instructions) stored on the memory executed by the processor, based on any number of reasons that the AP may consider (examples include number of associated STAs on band A versus band B, or the utilization of each band when its connected, or a switching policy, etc).

By operating a radio subsystem with this switching option for 5 and 6 GHz an AP can provide service to existing 5 GHz STAs as well as 6 GHz STAs, while not having to include complex filtering and isolation circuitry that's typical with concurrent operation of two adjacent bands.

The present disclosure contemplates using existing Wi-Fi RTS/CTS signaling in a different manner than it is currently used, i.e., using the CTS signaling as a way for managing the time sharing between bands. RTS stands for Request to Send. This is a packet that a STA would send to request to send data to another STA. The intended recipient STA sends back a CTS packet, which includes a duration field. In normal operation a STA initiates the process by sending an RTS frame, another STA receives the RTS and responds with a CTS frame. The CTS duration field instructs other stations to hold off from accessing the medium during the duration indicated in the CTS. While such an example utilizes available techniques within a current standard to achieve switching between existing clients and bands, other signaling mechanisms may be developed in the future, and use of such mechanisms is contemplated herein.

In order to utilize the RTS/CTS scheme with the present switching scheme, the AP sends a CTS packet with the value of the duration during which the STAs are not to communicate. In this way the CTS duration field is used to send the signal indicating the times Tnc_a to the STAs associated with bssid_b (STA5, STA6, STA7) and to send the signal indicating the times Tnc_b to the STAs associated with bssid_a (STA1, STA2, STA3, STA4). For example, the CTS (10 ms) and CTS (6 ms) are ways of using the RTS/CTS signaling to advise connected STAs that there is a 10 or 6 ms transmission about to occur, and that they need to set their NAV (network allocation vector) and count down the communicated time before accessing the Wi-Fi interface again. This can be useful for power saving mode in STAs, where they effectively power off their radios for the duration of time. In IEEE 802.11, the NAV represents the number of microseconds the sending STA intends to hold the medium busy (maximum of 32,767 microseconds). The upper limit provides ample space for time sharing across the different bands, although it is unlikely that this higher value would ever be used.

For simplicity, consider for a moment an equal channel switch time of an average of 10 ms per band, as opposed to the 10 ms/6 ms of the above examples. An equal channel switch time would half the time available per band. For example, for a 2×2 radio client device operating at Modulation and Coding Scheme MCS 5 with a maximum rate of 520 Mbps @80 MHz channel bandwidth, notwithstanding the channel access time (CSMA/CA), the 520 Mbps would drop to 260 Mbps, with the remaining 260 Mbps available on the other band. If there were 4 separate STAs all transmitting using 2×2 radios at MCS5, then each STA would only be able to get a quarter of the rate (130 Mbps) on average.

If the channel switch time was modified to be a 75:25 ratio, with 3 STAs on one band (the 75 ratio-weighted band), and 1 STA on the other band (the 25 ratio-weighted band), then each STA would get a quarter of the rate. The 75:25 ratio could be organized, for example, as 9 ms:3 ms channel switching times. As mentioned earlier the choice of the dwell time on each band can be very dynamic and be decided by the processor of the AP executing a program that evaluates metrics to provide a balanced performance profile.

Figure 6:
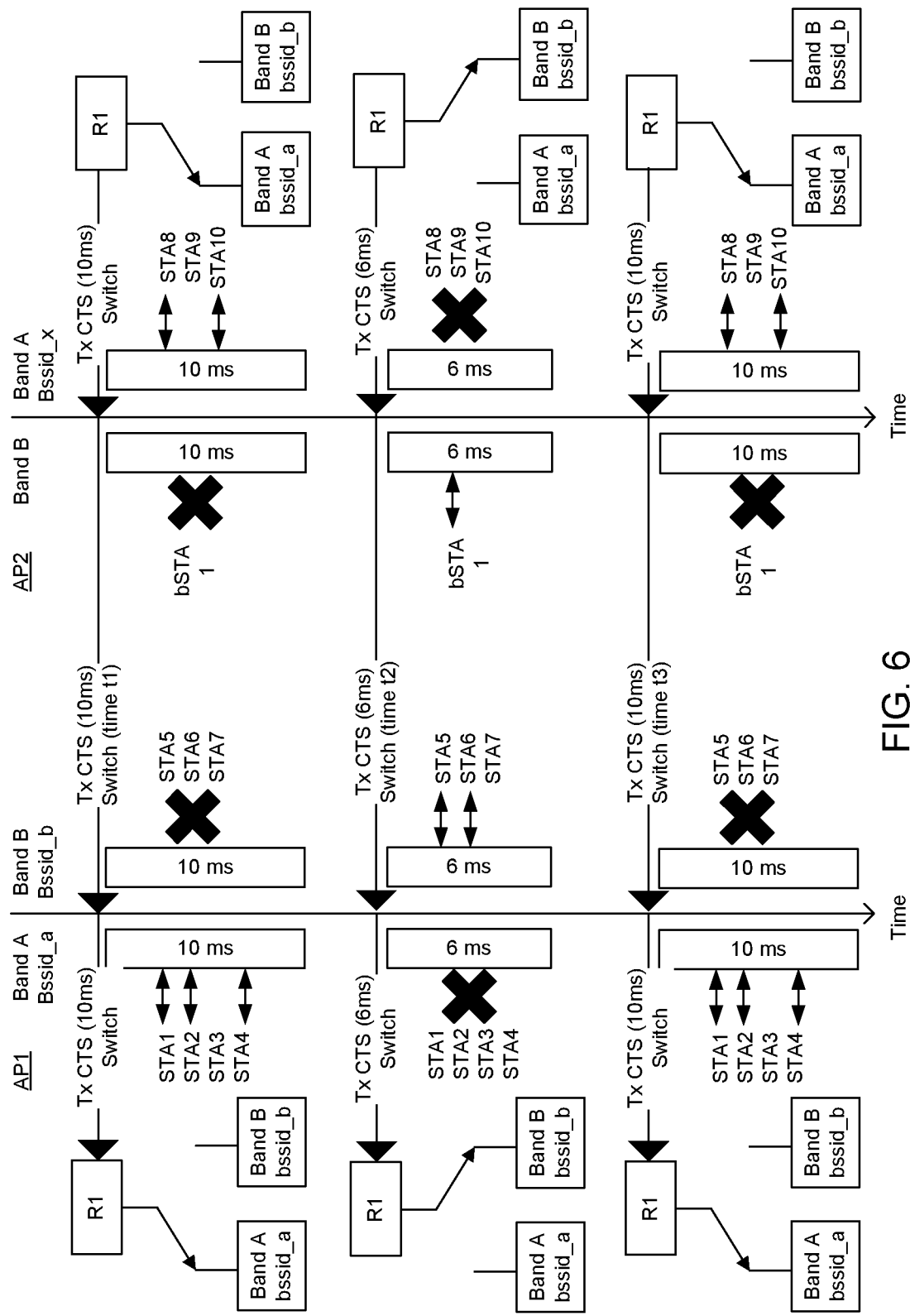
FIG. 6 is a sequence diagram of another example switching operation of the band switching radio subsystems of multiple APs.

The concept discussed above with respect to FIG. 5 can be used across multiple APs, and a signal from a coordinating AP could be sent to each additional AP indicating when the additional AP should switch bands. FIG. 6 shows an example of two APs (AP1 and AP2) operate to utilize the time sharing radio subsystem 1 in each of the two APs. AP2 is connected to AP1 through a wireless backhaul link (bSTA1). AP1 is the coordinating AP.

AP1 switches its radio subsystem 1 (R1) to band A at time t1 and operates a BSSID on band A (bssid_a) for a period of time, (Tnc_a), e.g., 10 ms, and sends a signal to all STAs associated with bssid_b, including the wireless backhaul STA (bSTA1) of AP2 to not communicate on the band for this period of time (Tnc_a), e.g., 10 ms. During this time Tnc_a, AP1 communicates with the STAs that are associated with bssid_a (STA1, STA2, STA3, STA4) and does not communicate with the STAs that are associated with bssid_b (STA5, STA6, STA7, bSTA1). Also during this time, in response to the signal sent by the AP1, the STAs associated with bssid_b (STA5, STA6, STA7, bSTA1) do not to communicate on the band for this period of time (Tnc_a), e.g., 10 ms.

In response to receiving the CTS signal at time t1, AP2 switches its radio subsystem 1 (R1) to band A and operates a BSSID on band A (bssid_x) for a period of time (Tnc_a), e.g., 10 ms, and sends a signal to all STAs associated with on band B (here the backhaul bSTA1) to not communicate on the band for this period of time (Tnc_a), e.g., 10 ms. During this time Tnc_a, AP2 communicates with the STAs that are associated with bssid_x (STA8, STA9, STA10) and does not communicate with using its backhaul bSTA1.

At time t2, the AP1 sends a signal to the STAs associated with bssid_a (STA1, STA2, STA3, STA4) to not communicate on band A for a period of time Tnc_b, e.g., 6 ms, and switches to band B. AP2 also sends a signal to the STAs associated with bssid_x (STA8, STA9, STA10) to not communicate on band A for a period of time Tnc_b, e.g., 6 ms, and switches to band B Data indicating the duration is included in the signal so the STAs know how long to not communicate on band A.

AP1 then switches its radio subsystem 1 (R1) to band B and operates a BSSID on band B (bssid_b) for a period of time (Tnc_b), e.g., 6 ms. During this time Tnc_b, the AP1 communicates with the STAs that are associated with bssid_b (STA5, STA6, STA7, bSTA1) and does not communicate with the STAs that are associated with bssid_a (STA1, STA2, STA3, STA4). Also during this time, in response to the signal sent by the AP1, the STAs associated with bssid_a (STA1, STA2, STA3, STA4) do not to communicate on the band for this period of time (Tnc_a), e.g., 6 ms.

In response to receiving the CTS signal at time t2, AP2 switches its radio subsystem 1 (R1) to band B and operates on band B with its backhaul bSTA1 for a period of time, (Tnc_a), e.g., 6 ms, and sends a signal to all STAs associated with bssid_x (STA8, STA9, STA10) to not communicate on the band for this period of time (Tnc_a), e.g., 6 ms. During this time Tnc_a, AP2 communicates with AP1 via the wireless backhaul and does not communicate with the STAs that are associated with bssid_x (STA8, STA9, STA10). Also during this time, in response to the signal sent by the AP2, the STAs associated with bssid_x (STA8, STA9, STA10) do not to communicate on the band for this period of time (Tnc_a), e.g., 6 ms.

At time t3, the AP1 sends a signal to the STAs associated with bssid_b (STA5, STA6, STA7, bSTA1) to not communicate on band B for a period of time Tnc_a, e.g., 10 ms, and switches to band A. In response to receiving the CTS signal at time t3, AP2 switches its radio subsystem 1 (R1) to band A and operates on band A (bssid_x) for a period of time, (Tnc_a), e.g., 10 ms, and signals bSTA1 to not communicate on the band for this period of time (Tnc_a), e.g., 10 ms. During this time Tnc_a, AP2 communicates with the STAs that are associated with bssid_x (STA8, STA9, STA10) and does not communicate with using its backhaul bSTA1.

The process of switching between bands continues like this, providing bursts of time to each bssid on a different band. The time spent on each band can be changed dynamically by the APs, according to software (instructions) stored on the memory executed by the processor, based on any number of reasons that the APs may consider (examples include number of associated STAs on band A versus band B, or the utilization of each band when its connected, or a switching policy, backhaul considerations etc).

BSS Coloring can also be employed as a way of organizing the multiples STAs to be able to reuse the same band during common transmission. In FIG. 6, there are three bssid (bssid_a, bssid_b, bssid_x) and band B is used by AP2 for its wireless backhaul bSTA communicating with bssid_b of AP1. Considering the three bssid (a, b and x), given the potential proximity of AP1 and AP2, it is possible that when a transmission occurs on bssid_a at the same time as one occurs on bssid_x, then due to channel sensing by transmitters, at least one transmitter may back off. If BSS Coloring is applied in this scenario, then it is possible for bssid_a and associated STAs to operate on band A while bssid_x and its associated STAs also operate on band A, and be able to ignore any overlapping transmissions in the same band, because they are able identify each BSS color and continue to transmit.

Figure 7:
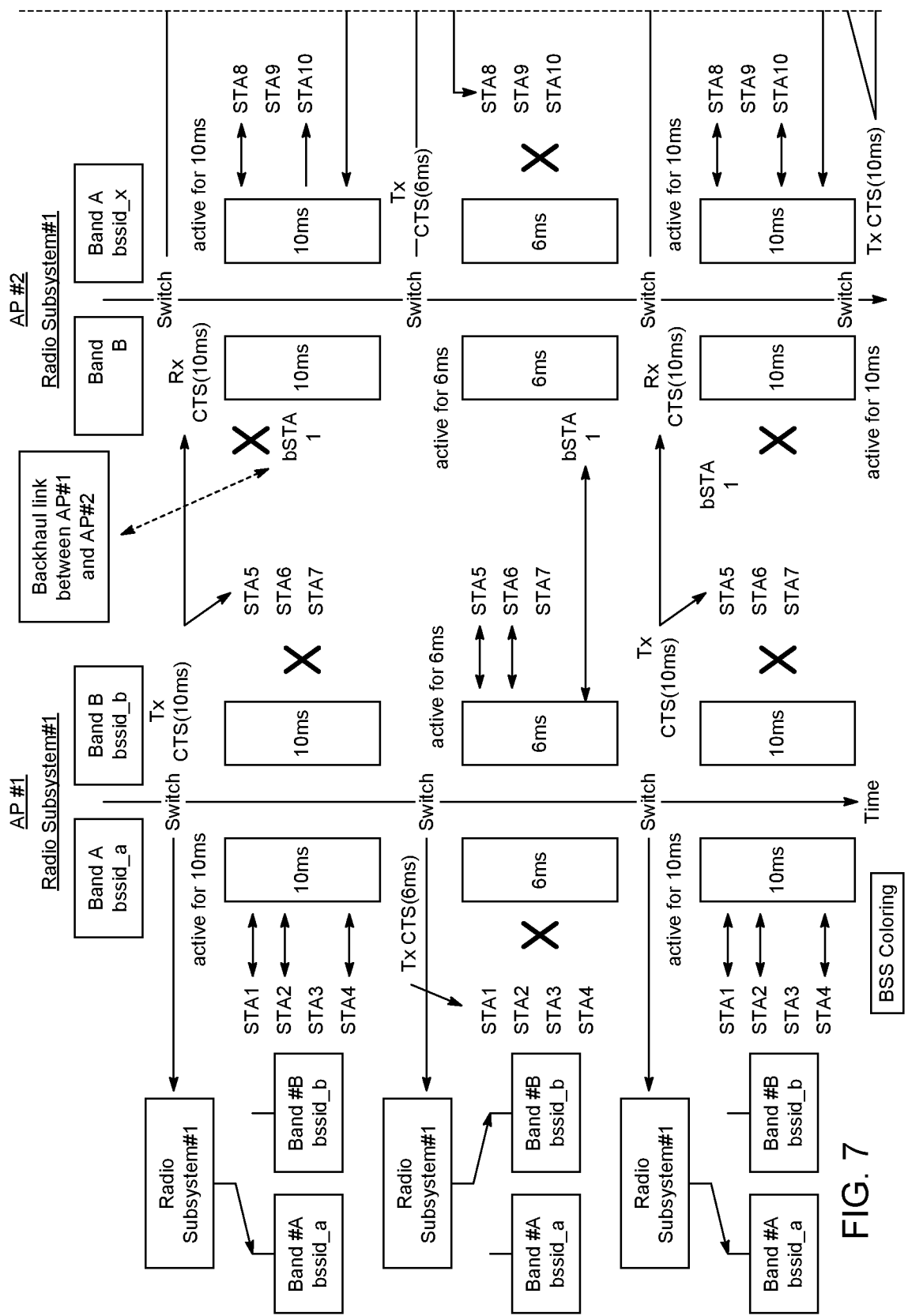
FIG. 7 is a sequence diagram of another example switching operation of the band switching radio subsystems of multiple APs.
Figure 7:
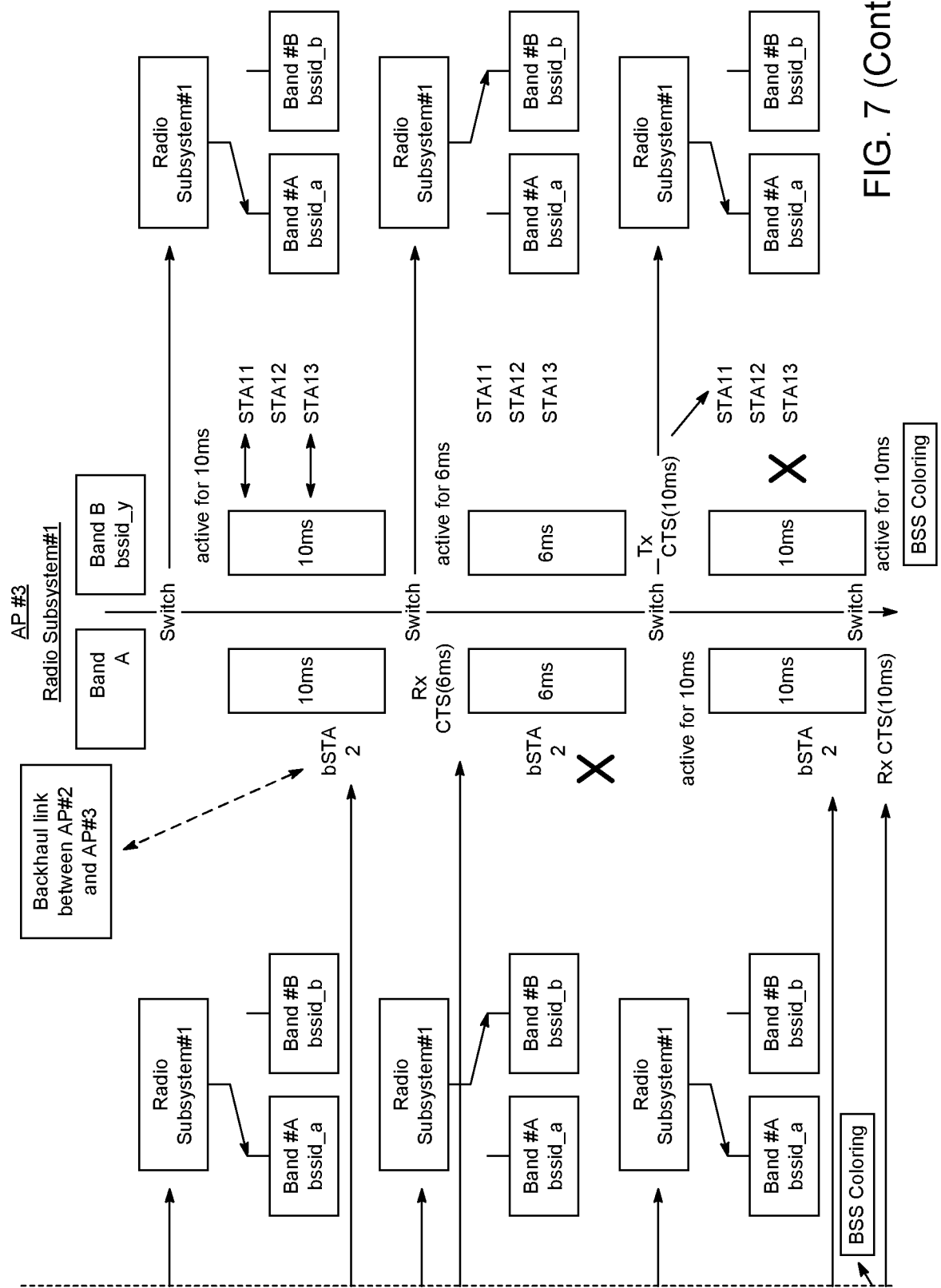

The above example of multiple APs cooperating in this time sharing is not limited to just two APs, and can be extended to many more APs, for example as shown in FIG. 7. The time share scheduling can be dynamic and be decided by the processor of the AP executing a program that evaluates metrics to provide a balanced performance depending on the situation, such as the number of APs and topology of the network. For example additional metrics such as queue buildup in an individual or group of APs could all be used to recalculate time share scheduling to ensure end to end performance is maintained.

Figure 8:
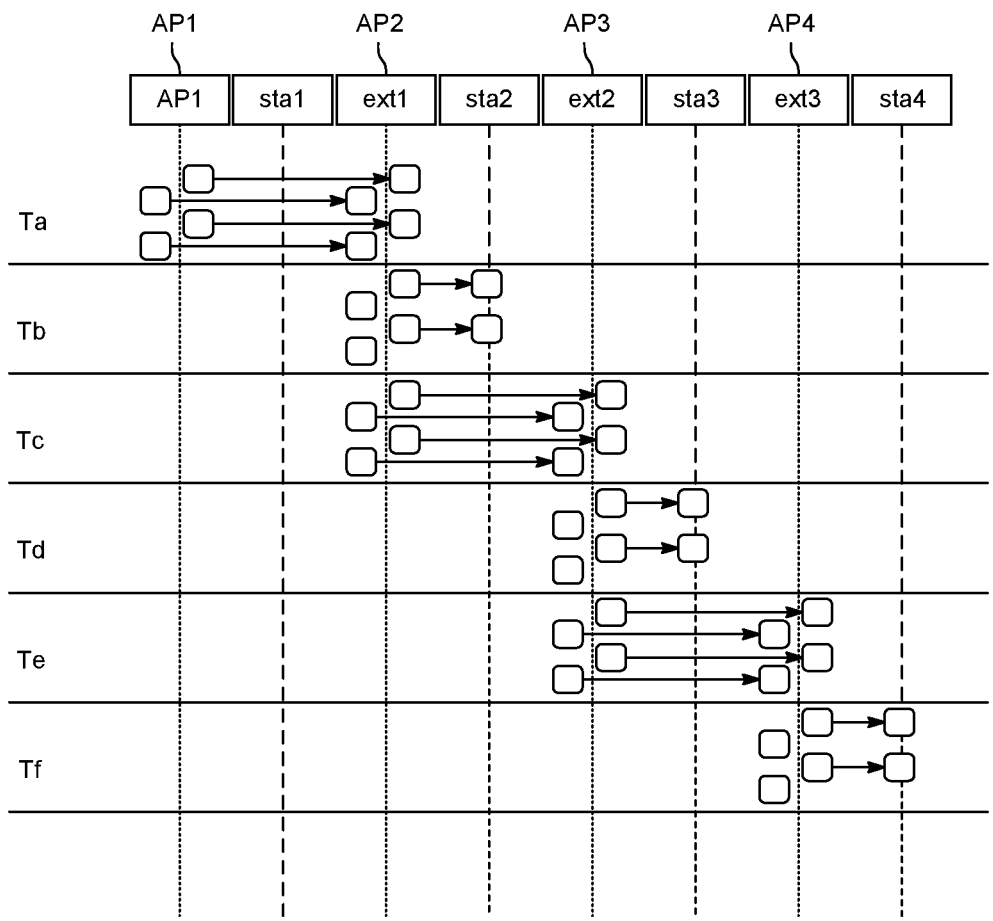
FIG. 8 is a diagram of example communication events of eight STAs over six time periods without operation of a band switching radio subsystem.

FIG. 8 is a diagram showing radios provisioned on multiple APs (AP1, AP2, AP3, AP4), some of which are extender devices. FIG. 8 shows the number of active transmitter/receiver pairs in the network. Four blocks below each device represents four active radios (transmitting or receiving) in a 4×4 device, i.e., AP1, AP2, AP3, and AP4. Two blocks below a device represents just two active radios in a 2×2 device (again either transmitting or receiving). FIG. 8 shows communications between radios over the course of six periods Ta, Tb, Tc, Td, Te, and Tf.

Figure 9:
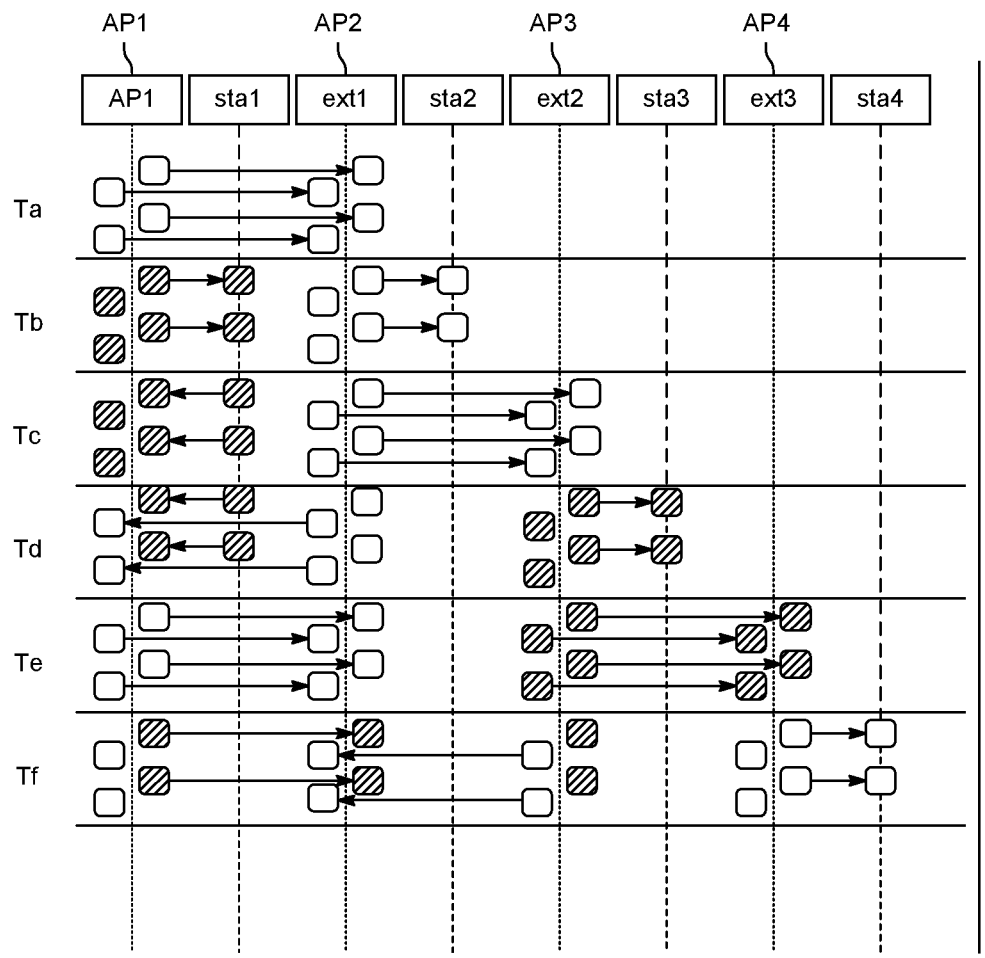
FIG. 9 is a diagram of example communication events of eight STAs over six time periods with operation of a band switching radio subsystem.

In comparison with FIG. 8, FIG. 9 shows possible communications using the band switching described above. Blocks filled in black represent radios that have switched to operate on a different band/sub-band. For example, all four radios of AP1 operate on band A during time Ta, and operate on band B in times Tb and Tc.

As shown in time periods Td and Tf, the 4×4 radios of AP1 are split to provide 2×2 radios for band A and the other 2>2 radios for band-B at the same time (possibly for some channels that really have a lot of frequency isolation between them—eg 5150 @2×2 and 6800 @2×2.

FIG. 9 illustrates that many more active transmissions can occur at the same time, as opposed to FIG. 8, by utilizing the band switching described above so as to support two or more bands with each radio.

If the 2×2-4×4-2×2 scenario of AP1, AP2, and AP3 in time period Tf is ignored for the moment, then FIG. 9 can been seen as showing the number of active transmissions possible compared to the non-switching model in FIG. 8. FIG. 8 shows instances in time where radios are sitting idle, while FIG. 9 shows the transmitters attempt to use every opportunity to transmit/receive. Such an operation will be useful for 6 GHz initial deployments.

FIGS. 8 and 9 can be taken as showing, for example, a 5 GHz backhaul, DBC setup, with four STAs, four APs (AP1+three extenders), and 1 STA connected per AP. In the six time periods Ta-Tf, a maximum of 6 AMPDUs (Aggregated MAC Protocol Data Units) are sent during this period of time. With eight Wi-Fi devices as shown in FIGS. 8 and 9, in an ideal situation, each pair of devices could send traffic per each time interval (if on different frequencies). So 4*6=24 AMPDUs could be sent (four pairs times six time periods), which is much higher than the actual 6 AMPDUs sent.

FIG. 9 shows a configuration where a 4×4 AP (AP or EXT) could dynamically switch between a different frequency in a band or between different bands (e.g., 5 to 6 GHz). Such a configuration yields at least 13 AMPDUs transmitted in the same time frame (Ta-Tf) as follows:

in time period Ta, AMPDU between AP1 and AP2;

in time period Tb, AMPDUs between AP1 and sta1, and between AP2 and sta2;

in time period Tc, AMPDUs between AP1 and sta1, and between AP2 and AP3;

in time period Td, AMPDUs between AP1 and sta1, and between AP1 and AP2, and between AP3 and sta3;

in time period Te, AMPDUs between AP1 and AP2, and between AP3 and AP4; and in time period Tf, AMPDUs between AP1 and AP2, and between AP2 and AP3, and between AP4 and sta4.

Further, as indicated by the non-communicating radios in the example of FIG. 9, more than the thirteen AMPDUs can be accomplished in the time frame Ta-Tf.

Also, in the example of FIG. 9, what is shown is a 4×4 radio operating in dual 2×2 mode for receiving, where in time period Tc, sta1 sends AMPDU on the band B, while AP2 sends an AMPDU on the band A. In time period Te, AP1 communicates with AP2 while AP3 talks to AP4. In time Tf, AP1 and AP3 transmit concurrently to AP2, which has reconfigured its 4×4, to receive on both band A and band B at same time. Note also that AP4 communicates with sta4 during the same time period Tf.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories stores software or algorithms with executable instructions and the one or more processors can execute a set of instructions of the software or algorithms in association for providing monitoring and installation enhancements in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

The invention claimed is:

1. A first electronic wireless communication apparatus connected to a second electronic wireless communication apparatus via a wireless backhaul link, the first electronic wireless communication apparatus comprising:
   a radio configured to selectively switch between a first band and a second band so as to selectively communicate with at least one first STA associated for communication on the first band and at least one second STA associated for communication on the second band;
   a memory having instructions stored thereon;
   a processor configured to execute the instructions stored on the memory to cause the apparatus to perform at least the following:
   a. switch the radio to the first band at a first time to enable communication with the at least one first STA during a first duration, and disable communication by the radio on the second band during the first duration, and transmit a signal to each STA associated with the second band and the second electronic wireless communication apparatus to not communicate on the second band during the first duration including not communicating on the wireless backhaul link;
   b. transmit, at a time during the first duration, a first stop signal including a second duration value to the at least one first STA, the first stop signal instructing the at least one first STA to not communicate on the first band during the second duration indicated in the first stop signal;
   c. switch the radio to the second band to enable communication with the at least one second STA during the second duration and the wireless backhaul link, and disable communication by the radio on the first band during the second duration; and
   d. transmit, at a time during the second duration, a second stop signal including a first duration value to the at least one second STA, the signal instructing the at least one second STA to not communicate on the second band during the first duration indicated in the second stop signal, wherein the first duration and the second duration are dynamically changeable.

2. The electronic wireless communication apparatus according to claim 1, wherein the processor repeats a through d.

3. The electronic wireless communication apparatus according to claim 1, wherein a third STA associated for communication on the second band is a backhaul STA of a wireless extender device.

4. The electronic wireless communication apparatus according to claim 1, wherein the first band has a first BSSID thereon, and the second band has a second BSSID thereon, and the second BSSID is different from the first BSSID.

5. A method of a first electronic wireless communication connected to a second electronic wireless communication apparatus via a wireless backhaul link for use with a processor and a radio configured to selectively switch between a first band and a second band so as to selectively communicate with at least one first STA associated for communication on the first band and at least one second STA associated for communication on the second band, the method comprising:
   a. switching, by the processor, the radio to the first band at a first time to enable communication with the at least one first STA during a first duration, and disable communication by the radio on the second band during the first duration, and transmit a signal to each STA associated with the second band and the second electronic wireless communication apparatus to not communicate on the second band during the first duration including not communicating on the wireless backhaul link;
   b. transmitting, via the radio, at a time during the first duration, a first stop signal including a second duration value to the at least one first STA, the first stop signal instructing the at least one first STA to not communicate on the first band during the second duration indicated in the first stop signal;

c. switching, by the processor, the radio to the second band to enable communication with the at least one second STA during the second duration and the wireless backhaul link, and disable communication by the radio on the first band during the second duration; and d. transmitting, via the radio, at a time during the second duration, a second stop signal including a first duration value to the at least one second STA, the signal instructing the at least one second STA to not communicate on the second band during the first duration indicated in the second stop signal, wherein the first duration and the second duration are dynamically changeable.

6. The electronic wireless communication method according to claim 5, further comprising repeating a through d.

7. The electronic wireless communication method according to claim 5, wherein one of the at least one third STA associated for communication on the second band is a backhaul STA of a wireless extender device.

8. The electronic wireless communication method according to claim 5, wherein the first band has a first BSSID thereon, and the second band has a second BSSID thereon, and the second BSSID is different from the first BSSID.

9. A non-transitory computer-readable medium of a first electronic wireless communication apparatus connected to a second electronic wireless communication apparatus via a wireless backhaul link, the non-transitory computer-readable medium having stored thereon instructions for execution by a processor to perform at least the following:

a. switching, by the processor, a radio to a first band at a first time to enable communication with at least one first STA associated for communication on the first band during a first duration, and disable communication by the radio on a second band during the first duration and transmit a signal to each STA associated with the second band and the second electronic wireless communication apparatus to not communicate on the second band during the first duration including not communicating on the wireless backhaul link, wherein the radio is configured to selectively switch between the first band and the second band so as to selectively communicate with the at least one first STA and at least one second STA associated for communication on the second band;

b. transmitting, via the radio, at a time during the first duration, a first stop signal including a second duration value to the at least one first STA, the first stop signal instructing the at least one first STA to not communicate on the first band during the second duration indicated in the first stop signal;

c. switching, by the processor, the radio to the second band to enable communication with the at least one second STA during the second duration and the wireless backhaul link, and disable communication by the radio on the first band during the second duration; and d. transmitting, via the radio, at a time during the second duration, a second stop signal including a first duration value to the at least one second, the signal instructing the at least one second STA to not communicate on the second band during the first duration indicated in the second stop signal, wherein the first duration and the second duration are dynamically changeable.

10. The non-transitory computer-readable medium according to claim 9, further comprising instructions for execution by the processor further perform at least the following: repeating a through d.

11. The non-transitory computer-readable medium according to claim 9, wherein one of the at least one third STA associated for communication on the second band is a backhaul STA of a wireless extender device.

12. The non-transitory computer-readable medium according to claim 9, wherein the first band has a first BSSID thereon, and the second band has a second BSSID thereon, and the second BSSID is different from the first BSSID.

* * * * *